(12) United States Patent
Mallard (10) Patent No.: US 10,723,082 B2
(45) Date of Patent: Jul. 28, 2020

(54) HOUSING ASSEMBLY AND METHOD

(71) Applicant: Ford Motor Company Limited, Brentwood (GB)

(72) Inventor: William John Mallard, Southend on Sea (GB)

(73) Assignee: Ford Global Technologies, LLC, Dearborn, MI (US)

(*) Notice: Subject to any disclaimer, the term of this patent is extended or adjusted under 35 U.S.C. 154(b) by 46 days.

(21) Appl. No.: 15/920,310

(22) Filed: Mar. 13, 2018

(65) Prior Publication Data

US 2018/0290389 A1 Oct. 11, 2018

(30) Foreign Application Priority Data

Apr. 7, 2017 (GB) .................................. 1705616.9

(51) Int. Cl.
*B29C 65/34* (2006.01)
*F16J 15/10* (2006.01)
(Continued)

(52) U.S. Cl.
CPC ........ *B29C 65/342* (2013.01); *B29C 65/3432* (2013.01); *B29C 65/3476* (2013.01);
(Continued)

(58) Field of Classification Search
CPC ............ B29C 65/3432; B29C 65/3476; B29C 65/3468; B29C 65/362; B29C 65/3632; B29C 65/3676; B29C 65/76; B29C 66/12423; B29C 66/232; B29C 66/24249; B29C 66/301; B29C 66/30325;
(Continued)

(56) References Cited

U.S. PATENT DOCUMENTS 3,047,703 A 7/1962 Aske
4,586,624 A 5/1986 Shaw
(Continued)

FOREIGN PATENT DOCUMENTS

CA 2007520 C 8/2000
CN 203595095 U 5/2014
JP S59118426 A 7/1984

OTHER PUBLICATIONS

Great Britain Intellectual Property Office, Combined Search and Examination Report Issued in Application No. GB1705616.9, dated Sep. 27, 2017, 6 pages.

*Primary Examiner* — Gilbert Y Lee
(74) *Attorney, Agent, or Firm* — Geoffrey Brumbaugh; McCoy Russell LLP (57) ABSTRACT

A cover for a housing of a vehicle and a method of sealing a cover to the housing, where in at least one example, the cover comprises a cover body configured to cover an opening of the housing and to engage the housing at an interface around the opening. The cover may comprise a heating element embedded within the cover body and operable to at least partially melt a portion of the cover body as a part of a process for sealing the cover to the housing. The portion of the cover body may deform and conform to an interface feature at the mating surface of the housing due to the at least partial melting of the portion of the cover body, and, in some examples, the heating element may be configured to fail and be inoperable.

10 Claims, 3 Drawing Sheets

(51) Int. Cl.
*B29C 65/00* (2006.01)
*F16J 15/04* (2006.01)
*B29L 31/30* (2006.01)
*F02M 26/72* (2016.01)
*B29C 65/36* (2006.01)
*B29C 65/76* (2006.01)

(52) U.S. Cl.
CPC ...... *B29C 66/12423* (2013.01); *B29C 66/232* (2013.01); *B29C 66/24244* (2013.01); *B29C 66/24249* (2013.01); *B29C 66/301* (2013.01); *B29C 66/30325* (2013.01); *B29C 66/53461* (2013.01); *B29C 66/542* (2013.01); *F16J 15/04* (2013.01); *F16J 15/108* (2013.01); B29C 65/3468 (2013.01); B29C 65/362 (2013.01); B29C 65/3632 (2013.01); B29C 65/3676 (2013.01); B29C 65/76 (2013.01); B29C 66/0244 (2013.01); B29C 66/3452 (2013.01); B29C 66/3472 (2013.01); B29C 66/71 (2013.01); B29C 66/7392 (2013.01); B29C 66/73115 (2013.01); B29C 66/73117 (2013.01); B29C 66/91645 (2013.01); B29C 66/91655 (2013.01); B29C 66/91933 (2013.01); *B29C 66/91943* (2013.01); *B29L 2031/30* (2013.01); *F02M 26/72* (2016.02)

(58) Field of Classification Search
CPC ............ B29C 66/53461; B29C 66/542; B29C 66/0244; B29C 66/3452; B29C 66/3472; B29C 66/71; B29C 66/73115; B29C 66/73117; B29C 66/7392; B29C 66/91645; B29C 66/91655; B29C 66/91933; B29C 66/91943; F16J 15/04; F16J 15/108; F16J 15/14; F02M 26/72; B29L 2031/30
See application file for complete search history.

(56) References Cited

U.S. PATENT DOCUMENTS

| | | |
|---|---|---|
| 5,968,442 A | 10/1999 | Sato et al. |
| 2004/0217553 A1 | 11/2004 | Shaw et al. |
| 2005/0139644 A1 | 6/2005 | Brese et al. |
| 2011/0291362 A1* | 12/2011 | Otake ................... B60R 13/06 277/316 |

* cited by examiner

HOUSING ASSEMBLY AND METHOD

CROSS REFERENCE TO RELATED APPLICATION

The present application claims priority to Great Britain Patent Application No. 1705616.9, filed Apr. 7, 2017. The entire contents of the above-referenced application are hereby incorporated by reference in its entirety for all purposes.

TECHNICAL FIELD

The present disclosure relates to a housing assembly for a motor vehicle and is particularly, although not exclusively, concerned with a housing assembly configured to improve the manufacturability of the housing assembly.

BACKGROUND

Covers are often fitted to housings within assemblies and subassemblies for motor vehicles in order to protect components that have been installed within the housing. For example, a housing may be provided to house electrical components of the vehicle and, following installation of the electrical components, a cover may be fitted over the housing in order to prevent dust or other objects and/or moisture from entering the housing and interfering with the operation of the electrical components.

In order to seal the housing against moisture, a seal, such as an O-ring seal, a rope seal or a liquid sealant, such as a room temperature vulcanization silicone sealant, may be provided between the housing and the cover. A plurality of fasteners are typically positioned around the perimeter of the cover in order to couple the cover to the housing and clamp the cover and housing together to ensure that the interface is sealed around the perimeter of the cover.

Sealing between the housing and the cover in this way may be undesirable, as the additional seal component increases the number of parts within the assembly for the vehicle and the large number of fasteners required to clamp the seal around the perimeter of the cover increases the amount of time required to assemble the vehicle assembly on the vehicle production line.

It is therefore desirable to provide a housing assembly with improved manufacturability.

According to an aspect of the present disclosure, there is provided a cover for a housing within a vehicle, wherein the cover comprises: a cover body configured to cover an opening of the housing and to engage the housing at an interface around the opening, the cover body having a mating surface that engages a corresponding mating surface of the housing so as to form the interface; and a heating element embedded within the cover body and operable to at least partially melt a portion of the cover body, such that the portion of the cover body deforms in order to conform to an interface feature at the mating surface of the housing, e.g. in order to couple the cover to the housing and/or to create a seal between the cover and the housing.

The interface may extend at least partially around an edge of the cover body. The heating element may be embedded at the edge of the cover body, e.g. around a perimeter of the cover body.

The cover may be configured such that the portion of the cover body that is to be at least partially melted by the heating element extends along a length of the interface, e.g. along substantially the complete length of the interface, when the heating element is operated. In some arrangements, the portion of the cover body that is to be at least partially melted may extend around, e.g. substantially completely around, a perimeter of the cover body.

The portion of the cover body that is to be at least partially melted by the heating element may have a greater thickness than an adjacent portion of the cover that is not to be melted by the heating element.

The heating element may comprise a resistive wire embedded within the cover body. The ends of the resistive wire may extend outside of the cover body, e.g. at an edge. The resistive wire may comprise a first portion having a first diameter and a second portion having a second diameter. The first diameter may different from the second diameter. For example, the first diameter may be larger than the second diameter.

The cover may comprise a further resistive wire. The diameter of the further resistive wire may be different from the diameter of the resistive wire. The further resistive wire may form a further heating element of the cover.

The cover may further comprise an insulating element adjacent to a portion of the heating element. The insulating element may be configured to reduce heating of the cover body by the portion of heating element or further heating element, e.g. in a region adjacent to the portion of the heating element or further heating element. The insulating element may be embedded within the cover body. The insulating element may substantially surround the portion of the heating element, e.g. forming a sheath.

The insulating element may be provided at or adjacent to a location at which the heating element extends outside the cover body. In other words, the insulating element may be provided at or close to an edge of the cover body.

A perimeter of the cover body defined by the cover mating surface may be non-planar, e.g. the perimeter may not lie in a flat plane. For example, the perimeter and/or the mating surface may comprise steps, ramps or curves that depart from a flat plane.

A housing assembly for a vehicle may comprise the above-mentioned cover and the housing.

The interface feature may comprise a depression configured to receive the deformed portion of the cover body when the cover body deforms. The interface feature may comprise a key feature configured such that the deformed portion of the cover body is retained at the interface feature, e.g. after the deformed portion has re-solidified. For example, an opening of the depression may have a reduced area compared to a recessed portion of the depression.

A perimeter of the housing opening defined by the housing mating surface may be non-planar.

A vehicle may comprise the above-mentioned cover or the above-mentioned housing assembly.

According to another aspect of the present disclosure, there is provided a method of sealing a cover to a housing within a motor vehicle, the method comprising: providing the housing, wherein the housing comprises an interface feature; providing the cover, wherein the cover comprises: a cover body configured to engage and cover at least a portion of the housing; and a heating element embedded within the cover body; and heating the cover body using the heating element, such that a portion of the cover body at least partially melts and deforms in order to conform to the interface feature of the housing.

The step of providing the cover may comprise supporting the heating element within a mould and moulding the cover body in the mould.

The heating element may comprise a resistive wire embedded within the cover body. The step of heating the cover body may comprise applying an electric current to the resistive wire.

Alternatively, the step of heating the cover body may comprise inducing an electric current within the resistive wire using an electromagnetic coil arranged outside of the cover.

The heating element may comprise a further resistive wire embedded within the cover body. The step of heating the cover may comprise applying a further electric current to the further resistive wire. Alternatively, the step of heating the cover may comprise inducing a further electric current within the further resistive wire, e.g. using a further electromagnetic coil. The magnitude of the further electric current may be different from that of the electric current. For example, the magnitude of the further electric current may be greater than the magnitude of the electric current.

The method may further comprise applying a force to the cover to press the cover against the housing whilst the cover is being heated. The force may be applied to the cover by providing a pressure difference between an inside of a housing space defined by the housing and the cover and an outside of the housing space.

The method may further comprise rapidly cooling, e.g. quenching in a fluid, the cover following deformation of the cover body portion. Quenching the cover may improve the material properties of the deformed portion of the cover. Furthermore, quenching the cover may reduce the time taken to complete the process of sealing the cover to the housing.

The method may comprise re-heating the cover body using the heating element, such that the portion of the cover body conforming to the interface feature at least partially melts. The method may further comprise removing the cover from the housing.

According to another aspect of the present disclosure, there is provided a method of detaching a cover from a housing for an assembly of a motor vehicle, wherein the housing comprises an interface feature, and the cover comprises: a cover body configured to engage and cover at least a portion of the housing; and a heating element embedded within the cover body, the heating element having been operated to partially melt a portion of the cover body, such that the portion of the cover body has deformed to conform to the interface feature, wherein the method comprises: re-heating the cover body using the heating element, such that the portion of the cover body conforming to the interface feature at least partially melts; and removing the cover from the housing.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

BRIEF DESCRIPTION OF THE DRAWINGS

For a better understanding of the present disclosure, and to show more clearly how it may be carried into effect, reference will now be made, by way of example, to the accompanying drawings, in which:

FIGS. 1-3 and 5 are drawn approximately to scale. However, other relative dimensions may be used if desired.

DETAILED DESCRIPTION

Figure 1:
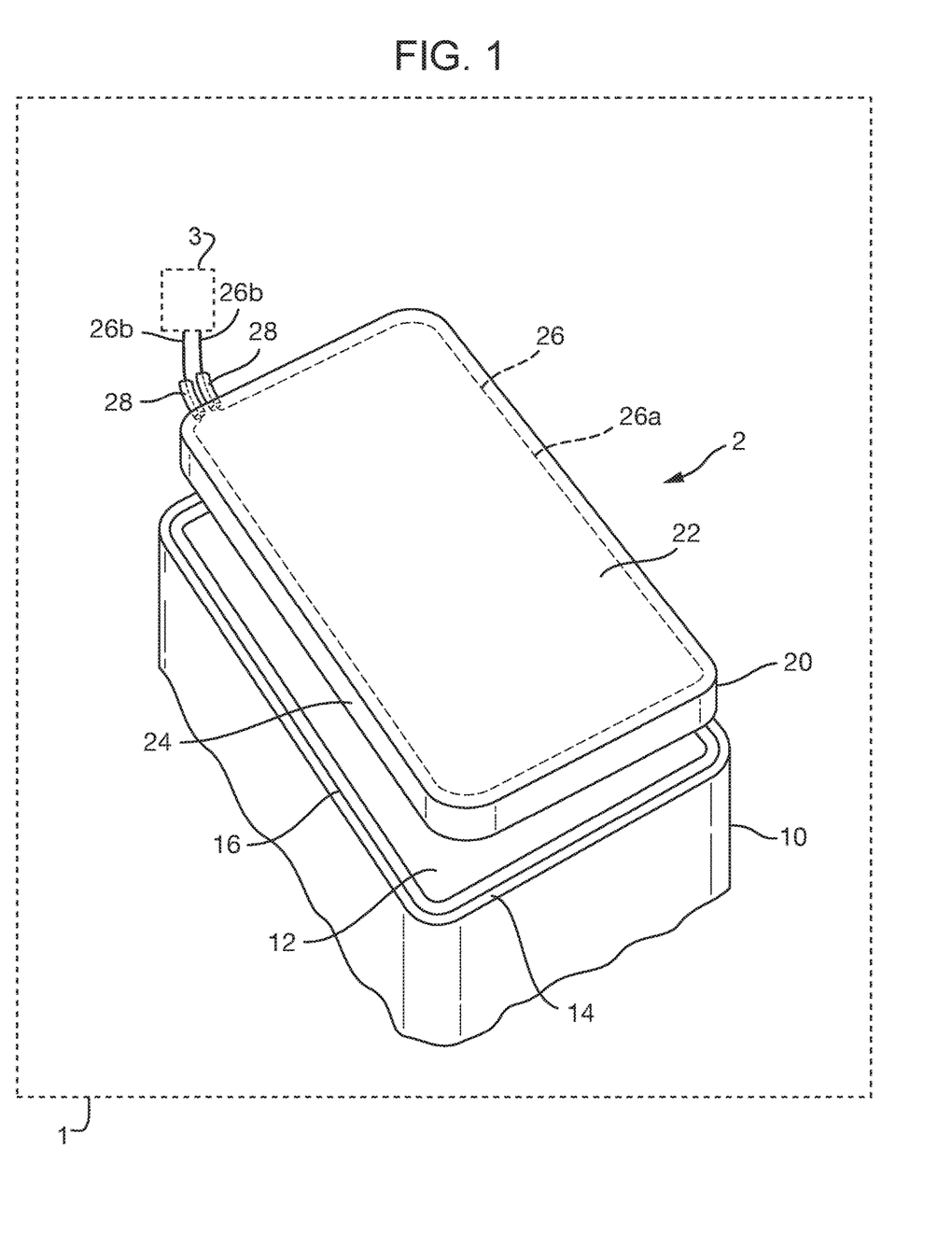
FIG. 1 is a perspective view of a housing assembly for an assembly of a vehicle, according to arrangements of the present disclosure.

With reference to FIG. 1, a housing assembly 2 for an assembly of a vehicle, such as a motor vehicle comprises a housing 10 and a cover 20. The housing 10 may define a housing space 12 configured to receive one or more components of the vehicle. The housing 10 and cover 20 may be positioned within a vehicle 1 in at least one example.

It is noted that FIGS. 1-3 and 5 show the relative positioning of various components of a housing assembly of a vehicle. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element (e.g., embedded within another element) or shown outside of another element may be referred as such, in one example.

In the arrangement depicted in FIG. 1, the housing assembly 2 is provided within an Exhaust Gas Recirculation (EGR) assembly of the vehicle and the housing 10 is configured to house an EGR valve configured to control the amount of exhaust gases recirculated by the EGR assembly. In some arrangements, the housing assembly 2 may be provided within an electrical assembly of the vehicle and may be configured to house electrical components, such as connectors, switches, relays and/or any other electrical components. In other arrangements, the housing 10 may be provided within any other assembly of the vehicle and may be configured to house any other desirable components.

The vehicle components may be installed into the housing space 12 and the cover 20 may be coupled to the housing 10. As shown in FIG. 1, the housing may comprise a mating surface 14. The mating surface 14 may extend around the perimeter of a portion of the housing 10, e.g. around an opening to the housing space 12. The cover 20 may be coupled to the housing 10 at the mating surface 14.

In order to protect the components housed within the housing space 12 from dust and/or moisture, the cover 20 may be sealed to the housing 10 at the mating surface 14.

The cover 20 may comprise a cover body 22 having a cover edge 24. The cover edge 24 may define a perimeter of the cover body 22 or a portion of the cover body 22. As shown in FIG. 1, the cover edge 24 may at least partially correspond to the mating surface 14 of the housing 10. In other words, the cover edge 24 may define a mating surface of the cover corresponding to the mating surface 14 of the housing 10. In other arrangements, the mating surface of the cove corresponding to the mating surface 14 of the housing may be provided away from the cover edge.

The cover body 22 may be manufactured from a thermoplastic material, such as nylon, polyethylene or any other thermoplastic.

The cover 20 may further comprise a heating element 26 embedded within the cover, e.g. within the cover body 22 at the edge 24. The heating element 26 may extend along substantially the full length of the cover edge 24 and may substantially surround the portion of the cover body 22. Cover edge may also be manufactured from a thermoplastic material, such as nylon, polyethylene or any other thermoplastic.

The heating element 26 may be configured such that operating the heating element heats the cover edge 24 causing at least a portion of the cover edge 24 to deform. When the cover 20 has been positioned adjacent to the housing 20, e.g. during assembly of the housing assembly 2, heating the cover edge 24 using the heating element 26 may cause a portion of the cover edge 24 to deform such that it conforms to the shape of the mating surface 14 of the housing. When the heating element extends along substantially the full length of the cover edge 24, the portion of the cover edge that deforms may extend around the perimeter of the cover body, or portion of the cover body.

Heating the cover 20 using the heating element 26 may lead to a change in state of the material of the cover 20. In some arrangements, the material of the portion of the cover edge 24 may experience a phase transition and may transition from a solid state to a liquid state. In this case, the liquid portion of the cover edge 24 may flow over a surface of the mating surface 14 arranged adjacent to the cover edge 24 to conform to the shape of the cover.

Additionally or alternatively, the material of the portion of the cover edge may undergo a glass transition in which the material transitions into a viscous or rubbery state without changing phase. In this case, the portion of the cover edge may deform under gravity to conform to the surface of the mating surface 14 adjacent to the cover edge 24.

In some arrangements, a force may be applied to the cover in order to encourage the portion of the cover edge to deform such that it conforms to the mating surface 14. For example, a force may applied to the top of the cover acting to press the cover against the housing. The force may be applied to the cover at one or more discrete locations on the cover. Alternatively, the cover and at least part of the housing may be arranged within a chamber containing a pressurised fluid, such as air, that substantially surrounds the cover. The pressurised fluid may apply a force to the cover over the area of the cover exposed to the pressurised fluid. Additionally or alternatively, a vacuum may be generated within the housing space and the cover may be forced against the housing due to a difference in pressure, e.g. fluidic pressure, between inside and outside of the housing space, e.g. either side of the cover body.

The state change experienced by the material of the cover may depend on the temperature to which the portion of the cover is heated by the heating element. For example, if the cover is made from Nylon, the cover may undergo a glass transition between 47° C. and 70° C. and may transition to a liquid phase at 220° C.

In some arrangements, different portions of the cover edge may experience different state changes. For example, a portion directly adjacent to the heating element may transition into a liquid phase, and a portion located further from the heating element may undergo a glass transition. The term melting is used within this specification to refer to both changes of state, e.g. transition into a liquid phase, as well as glass transitions of the material of the cover, or any combination of the two.

Following heating by the heating element, the cover edge 24 may return to a solid or glassy state and the cover edge 24 may remain in conformity with the mating surface around the perimeter of the cover body. The interface between the cover and the housing may thereby be sealed against dust and/or moisture.

Figure 2:
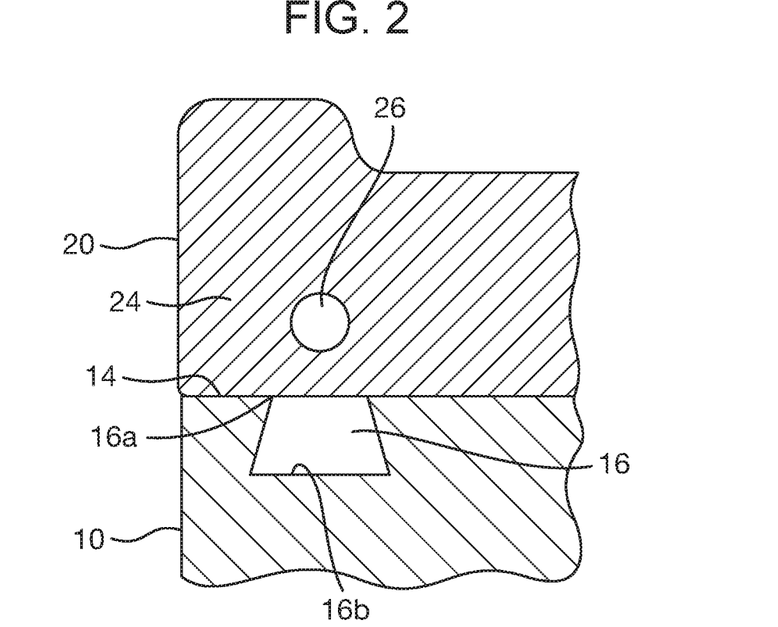
FIG. 2 is a cross-sectional view of an interface between a cover and a housing prior to the cover being coupled to the housing.
Figure 3:
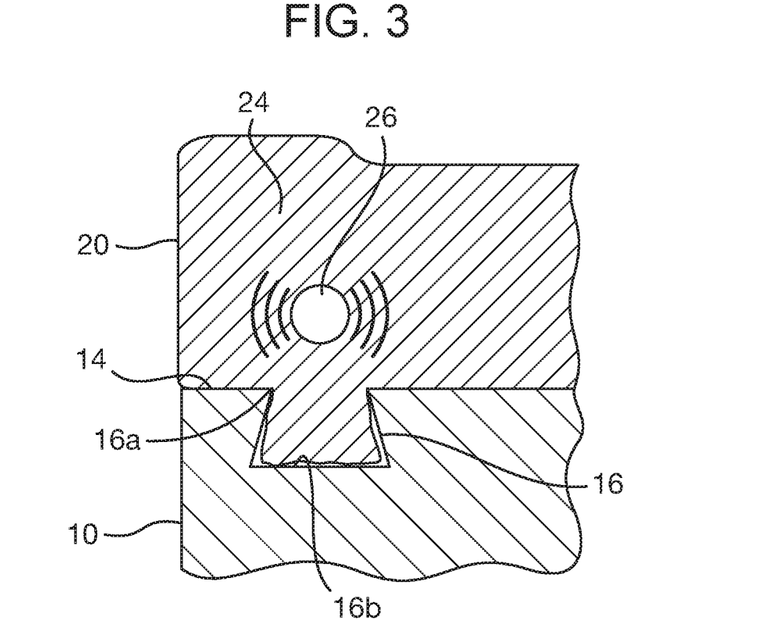
FIG. 3 is a cross-sectional view of an interface between a cover and a housing after the cover has been coupled to the housing.

With reference to FIGS. 2 and 3, the mating surface 14 may comprise one or more depressions 16. As shown in FIG. 1, the depression 16 may comprise a groove that extends around the mating surface 14. However, it is equally envisaged that the one or more depressions 16 may comprise a plurality of grooves and/or holes formed in the mating surface 14.

As depicted in FIG. 3, when the portion of the cover edge 24 is deformed due to heating by the heating element 26, the deformed portion of the cover edge 24 may deform, e.g. flow, into the depression 16 provided at the mating surface 14. When the portion of the cover edge 24 deforms into the depression 16, the seal created between the housing 10 and the cover 20 may be improved.

As depicted in FIGS. 2 and 3, a thickness of the cover edge 24 adjacent to the heating element 26 may be greater than a thickness of the cover edge 24 away from the heating element 26. For example, the thickness of the cover edge 24 may be 1.5 or 2 times greater adjacent to the heating element 26. In this way, the minimum thickness of the cover edge, e.g. outside of the depression 16, may not be affected by deforming the portion of the cover edge.

The depression 16 may comprise a key feature configured to prevent the deformed portion of the cover edge 24 from being removed from the depression when the cover edge 24 has returned to a solid or glassy state. As shown in FIGS. 2 and 3, the depression 16 may comprise an opening 16a and a recess 16b. A width of the opening 16a may be smaller than a width of the recess 16b. As shown in FIG. 3, when the cover edge 24 deforms, the shape of the deformed portion of the cover edge may conform to the shape of the opening 16a and recess 16b of the depression. The shape of the deformed portion may therefore prevent the deformed portion from being removed from the depression.

With reference to FIG. 1, the heating element 26 may comprise a resistive wire 26a embedded within the cover edge 24. Ends 26b of the resistive wire may protrude outside of the cover edge 24. In order to heat the cover edge 24, the ends 26b of the resistive wire may be coupled to a terminal of a current source 3 and an electric current may be passed through the resistive wire 24a. The electric current applied may vary depending on the size, e.g. diameter, of the resistive wire 24a and how much it is desirable to heat the material of the cover, e.g. the volume of the portion of the cover edge 24 that it is desirable to deform and whether it is desirable for the deforming portion of the cover edge 24 to flow over the mating surface 14, e.g. in a liquid state, or deform under gravity in a viscous or rubbery state to conform to the shape of the mating surface 14. The amount that it is desirable to heat the material of the cover edge 24 may depend on the material from which the cover 10 has been made and/or the design of the mating surface 14, e.g. the shape of the depressions 16 provided on the mating surface 14 and/or the key feature.

Figure 4:
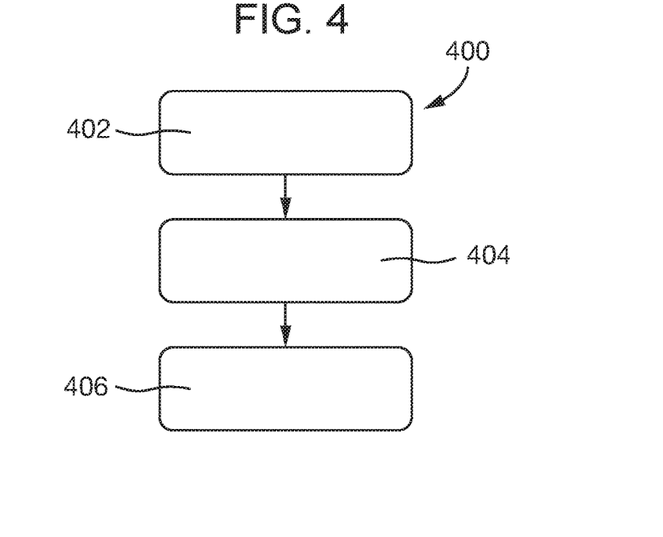
FIG. 4 shows a method of coupling a cover to a housing, according to arrangements of the present disclosure.

With reference to FIG. 4, the cover 20 may be sealed to the housing 10 of the vehicle assembly using a method 400. The method comprises a first step 402, in which the housing 10 is provided. One or more components of the vehicle, which are to be housed within the housing space 12 defined by the housing 10, may be installed into the housing before, during and/or after the first step 402.

In a second step 404 the cover 20 may be provided. The cover may be arranged such that the cover edge 24 is adjacent to the mating surface 14 of the housing 10. The cover may be manufactured using an injection moulding process. The heating element 26 may be overmoulded by the material forming the cover body during the manufacturing process of the cover. For example, the heating element 26 may be supported within a mould and a polymer, e.g. a thermoplastic, may be injected into the mould in order to form the cover body. Alternatively, any other suitable process for forming the cover and/or embedding the heating element 26 may be used.

In a third step 406, the cover may be heated using the heating element 26, e.g. by passing an electric current through the heating element, in order to melt at least a portion of the cover edge 24, such that the portion of the cover edge deforms such that it conforms to the mating surface of the housing. As described above, deforming the cover edge 24 in this way may create a seal between the cover 20 and the housing 10, and may couple the cover 20 to the housing 10.

After the cover has been deformed, e.g. once the cover edge has deformed to a desirable level, the cover may be quenched, e.g. rapidly cooled. By quenching the cover, the material properties of the deformed portion of the cover may be improved. Furthermore, rapidly cooling the cover may reduce the time taken to perform the process of sealing the cover to the housing, and hence, reduce the time taken to manufacture the assembly for the vehicle. The cover may be quenched by placing the assembly into a cold environment and/or by passing a cold fluid, such as air or water, over the cover.

In some cases, it may be desirable to detach the cover from the housing at a later stage. The method 400 may include a further detaching step, in which the cover is reheated using the heating element such that the portion of the cover edge at least partially melts. The cover 20 may then be detached from the housing 10.

In some arrangements, it may be desirable to reduce the amount that one or more areas of the cover edge 14 are heated by the heating element 26. For example, it may be desirable to reduce the amount that the cover edge 24 is heated at the position where the ends 26b of the resistive wire protrude from the cover edge, e.g. in order to prevent undesirable deformation of the cover edge. As shown in FIG. 1, the cover 10 may further comprise one or more insulating elements 28 provided adjacent to the heating element 26 and configured to reduce the transfer of heat from the heating element 26 to the cover edge 24 at the insulating element 28. The insulating element 28 may substantially surround a portion of the heating element 26, e.g. forming a sheath. As depicted in FIG. 1, the insulating element 28 may be embedded within the cover edge 14 and may protrude from the cover 20 together with the heating element 26.

It may be desirable to heat different portions of the cover edge 24 different amounts, e.g. at different rates. This may be achieved by varying the diameter of the resistive wire 26a along its length. For example, a first portion for the resistive wire may have a first diameter and a second portion of the resistive wire may have a second diameter. Hence, when the electric current is applied to the ends of the wire, the first portion of the resistive wire may heat up at a different rate to the second portion of the resistive wire.

Figure 5:
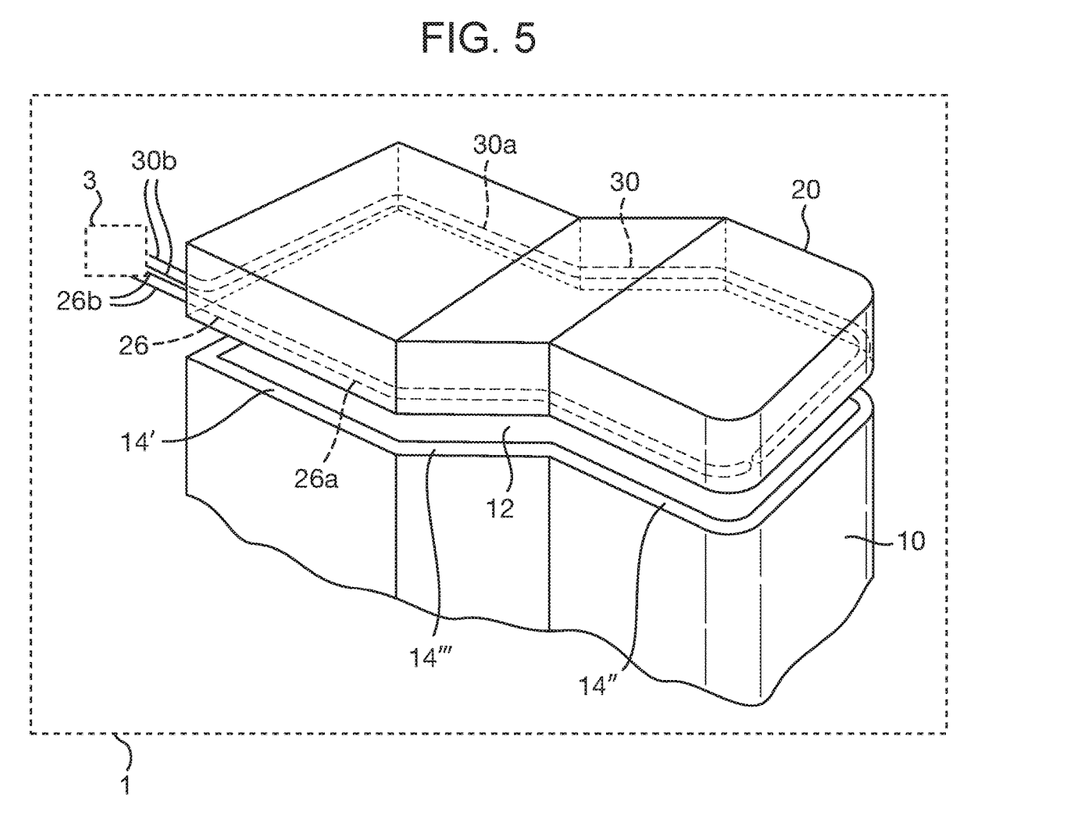
FIG. 5 is a perspective view of a housing assembly according to another arrangement of the present disclosure.

With reference to FIG. 5, in another arrangement of the disclosure, the cover 20 may comprise a further heating element 30. The further heating element 30 may be embedded within the cover edge 24. As depicted in FIG. 5, the heating element 26 may extend along a first side 24a of the cover edge and the further heating element 30 may extend along second, third and fourth sides 24b, 24c, 24d of the cover edge. As depicted in FIG. 5, the heating element 26 and the further heating element 30 may together extend around the perimeter of a portion of the cover 20, e.g. along substantially the full length of the cover edge 24. However, it is equally envisaged that, in other arrangements of the disclosure, the heating element 26 may extend around a first cover edge, e.g. that defines a perimeter around a first portion of the cover, and the further heating element 30 may extend around a second cover edge, e.g. that defines a perimeter around a second portion of the cover.

The further heating element 30 may comprise a further resistive wire 30a. The further resistive wire 30a may have a diameter that is different from the resistive wire 26a of the heating element 26. Hence, when the electrical current is applied to ends 30b of the further resistive wire, the further resistive wire 30b may heat up at a different rate to the resistive wire 26a. Alternatively, the further resistive wire 30a may be the same diameter as the resistive wire 26a. When the heating elements 26, 30 are operated to heat the cover edge 24, different currents may be applied to the resistive wire 26a and the further resistive wire 30a. The cover edge 24 may therefore be heated up at different rates along the first side 24a of the cover edge and the second, third and fourth sides 24b, 24c, 24d of the cover edge.

As depicted in FIG. 5, the mating surface 14 of the housing may not be planar. For example, as shown in FIG. 5, the mating surface 14 may comprise first and second parts 14', 14" that are substantially flat and a third part 14''' arranged at an angle relative to the first and second parts 14', 14". In other arrangements, the mating surface 14 may comprise any number of angled, ramped, curved or stepped parts. As depicted in FIG. 5, when the mating surface 14 is non planar, the shape of the cover edge 14 may be configured accordingly, e.g. such that the perimeter defined by the cover edge 14 is also non planar, and corresponds to the shape of the mating surface 14.

In some arrangements, at least a portion of the resistive wire and/or the further resistive wire may be configured to fail, e.g. at least partially melt and/or oxidize, such that they are no longer able to carry an electric current, once the resistive wire or further resistive wire has been heated to a predetermined temperature for a predetermined period of time.

Additionally or alternatively, at least a portion of the resistive wire and/or the further resistive wire may be configured to fail after the electric current has been applied to the resistive wire or further resistive wire for a predetermined period of time and/or when magnitudes of the electric current passed though the resistive wire or further resistive wire exceed respective threshold values.

In some arrangements, when the heating element and/or further heating element is operated, the current passing through the resistive wire and/or further resistive wire may be changed, e.g. increased, over the period of operating of the heating element and/or further heating element. For examiner, the current applied to the resistive wire and/or further resistive wire may be increased in discrete steps or continuously, e.g. linearly, over time. The manner in which the current is increased may be controlled in order to control the amount that the cover body is heated by the heating element and/or further heating element before the resistive wire and/or further resistive wire fails.

In this way, the resistive wire and/or further resistive wire may be configured to fail when the resistive wire and/or further resistive wire have heated portions of the cover adjacent to the resistive wire and further resistive wire by desirable amounts.

In other arrangements, the resistive wire and/or further resistive wire may be configured to fail once the cover has deformed by a predetermined extent. For example, the resistive wires may be arranged such that once the cover has deformed by the predetermined extent, the resistive wires become exposed to the atmosphere around the cover and become oxidized.

In the arrangements shown in FIGS. 1 and 5, ends 26b, 30b of the resistive wires extend outside of the cover in order to allow terminals from a current source to be coupled to the resistive wires to create an electrical connection and apply an electric current directly to the resistive wires. However, in other arrangements, ends of the resistive wires may not extend outside of the cover any may not be coupled to terminals of a current source. Instead, a voltage may be induced within the resistive wires by electromagnetic induction. An electromagnetic coil may be arranged outside of and adjacent to the cover and a current may be passed through the coil in order to induce a voltage in the resistive wire. Moreover, the heating element resistive wires may not be coupled to a current source once the cover mating surface has been deformed to conform to corresponding housing mating surface. For example, a method for sealing a cover to a housing may include decoupling all resistive wires of a heating element from a current source following deforming a cover mating surface to conform to a corresponding housing mating surface.

As mentioned above, in some arrangements, a chamber containing a pressurised fluid may be arranged such that it substantially surrounds the cover. The pressurised fluid within the chamber may press the cover against the housing as the cover deforms. In such arrangements, the electromagnetic coil may be provided within a wall of the chamber. In a similar manner, the pressure may be provided by a press and the electromagnetic coil may be provided in the press, e.g. close to a surface of the press that contacts the cover.

Thus, provided herein is a cover for a housing within a vehicle. In at least one example, the cover comprises a cover body which covers an opening of the housing and engages with the housing at an interface around the opening, the cover body having a mating surface that engages a corresponding mating surface of the housing so as to form the interface. Furthermore, the cover may further comprise a heating element embedded within the cover body and operable to at least partially melt a portion of the cover body, such that the portion of the cover body deforms and conforms to an interface feature at the mating surface of the housing. In another example, which may optionally include any one or combination of the features described above, the interface may extend at least partially around an edge of the cover body and the heating element may be embedded at the edge of the cover body. In one or more examples, the cover may be configured such that the portion of the cover body that is to be at least partially melted by the heating element extends along a length of the interface when the heating element is operated. Moreover, in one or more examples, the portion of the cover body that is to be at least partially melted by the heating element may have a greater thickness than an adjacent portion of the cover that is not to be melted by the heating element. Furthermore, the heating element may comprise a resistive wire embedded within the cover body in one or more examples.

In another example, which may optionally include one or more features of the above described example, a cover for a housing of a vehicle may comprise a cover body and a cover edge forming a perimeter around the cover body. In one or more examples, the cover edge may include a mating surface that engages a corresponding mating surface of the housing. Furthermore, the cover may also include at least one resistive wire embedded within the cover edge, where the at least one resistive wire is inoperable.

In at least one example which may include any one or combination of the above-discussed features, the mating surface of the cover edge and the corresponding mating surface of the housing contact one another to form an interface, the corresponding mating surface of the housing including one or more interface features for coupling the cover and the housing to one another. The one or more interface features of the housing mating surface includes at least one key feature that retains the deformed portion of the cover, for example. In at least one embodiment, the cover may be unable to be removed from the housing. Furthermore, it is noted that an inoperable resistive wire is unable to carry an electric current.

As mentioned above, a wire may be rendered inoperable by configuring the wire to fail, or in other words, break, under certain conditions. For example, the inoperable resistive wire may be broken by being at least partially melted. Additionally or alternatively, the resistive wire may be broken by being at least partially oxidized.

Turning to yet another example, which may optionally include any one or combination of features described above, a method of sealing a cover to a housing may be provided. In at least one example, the method may comprise aligning a cover mating surface and a corresponding housing mating surface, heating a heating element that is embedded within the cover and that is proximal the cover mating surface, at least partially melting the cover mating surface, and deforming the cover mating surface to conform to corresponding housing mating surface.

In one or more embodiments, the heating element may comprise a first resistive wire, and heating the heating element comprises applying a first electric current to the first resistive wire. Additionally, in at least one example, the heating element may further comprise a second resistive wire, and heating the heating element may further comprise applying a second electric current to the second resistive wire, wherein a magnitude of the second electric current is different from that of the first electric current.

In another example which may optionally include any one or combination of the features described above, the heating element may comprise a first resistive wire embedded within the cover body, and heating the heating element may comprise inducing a first electric current within the first resistive wire via an electromagnetic coil arranged outside of the cover. Additionally, the heating element may comprise a second resistive wire embedded within the cover body, wherein the step of heating the cover comprises inducing a second electric current within the second resistive wire, wherein the magnitude of the second electric current is different from that of the first electric current.

In at least one example, deforming the cover mating surface may comprise applying a force to the cover to press the cover mating surface against the corresponding housing mating surface while the cover mating surface is at least partially melted.

Moreover, the method may further comprise breaking the heating element, wherein the heating element is inoperable after the heating element is broken. The heating element may be broken responsive to the heating element being heated to at least a predetermined temperature for at least a predetermined period of time, for example. However, the heating element may be broken in other manners. For example, any one or combination of the configurations for causing the resistive wire(s) of the heating element to fail may be used to break the heating element.

It will be appreciated by those skilled in the art that although the disclosure has been described by way of example, with reference to one or more examples, it is not limited to the disclosed examples and alternative examples may be constructed without departing from the scope of the disclosure as defined by the appended claims.

The invention claimed is:

1. A cover for a housing within a vehicle, wherein the cover comprises:
a cover body which covers an opening of the housing and engages with the housing at an interface around the opening, the cover body having a mating surface that engages a corresponding mating surface of the housing so as to form the interface; and
a heating element comprising a resistive wire embedded within the cover body and operable to at least partially melt a portion of the cover body, such that the portion of the cover body deforms and conforms to an interface feature at the mating surface of the housing;
wherein the resistive wire comprises a first portion having a first diameter and a second portion having a second diameter, wherein the first diameter is different from the second diameter.

2. The cover of claim 1, wherein the interface extends at least partially around an edge of the cover body and the heating element is embedded at the edge of the cover body.

3. The cover of claim 1, wherein the cover is configured such that the portion of the cover body that is to be at least partially melted by the heating element extends along a length of the interface when the heating element is operated.

4. The cover of claim 1, wherein the portion of the cover body that is to be at least partially melted by the heating element has a greater thickness than an adjacent portion of the cover body that is not to be melted by the heating element.

5. A method of sealing a cover to a housing, comprising:
aligning a cover mating surface and a corresponding housing mating surface;
heating a heating element embedded within the cover, wherein the heating element comprises a first resistive wire embedded within the cover body;
at least partially melting the cover mating surface; and
deforming the cover mating surface to conform to the corresponding housing mating surface;
wherein the heating element further comprises a second resistive wire, and wherein heating the heating element further comprises applying a second electric current to the second resistive wire, wherein a magnitude of the second electric current is different from that of a first electric current.

6. The method of claim 5, wherein heating the heating element comprises inducing the first electric current within the first resistive wire via an electromagnetic coil arranged outside of the cover.

7. The method of claim 6, wherein the heating element comprises the second resistive wire embedded within the cover mating surface, and wherein the step of heating the cover comprises inducing the second electric current within the second resistive wire, wherein the magnitude of the second electric current is different from that of the first electric current.

8. The method of claim 5, wherein deforming the cover mating surface comprises applying a force to the cover to press the cover mating surface against the corresponding housing mating surface while the cover mating surface is at least partially melted.

9. The method of claim 8, further comprising breaking the heating element, wherein the heating element is inoperable after the heating element is broken.

10. The method of claim 9, wherein the heating element is broken responsive to the heating element being heated to at least a predetermined temperature for at least a predetermined period of time.

* * * * *